United States Patent [19]

Koyama

[11] Patent Number: 5,767,902

[45] Date of Patent: Jun. 16, 1998

[54] SOLID-STATE IMAGING DEVICE

[75] Inventor: Eiji Koyama, Nara, Japan

[73] Assignee: Sharp, Kabushiki, Kaisha, Osaka, Japan

[21] Appl. No.: 720,322

[22] Filed: Sep. 27, 1996

[30] Foreign Application Priority Data

Oct. 31, 1995 [JP] Japan ................... 7-284156

[51] Int. Cl.$^6$ .............................. H04N 3/14; H04N 5/335
[52] U.S. Cl. ................................ 348/294; 348/311
[58] Field of Search ........................ 348/314, 294, 348/302, 304, 303, 311, 308; 257/229, 230, 223

[56] References Cited

U.S. PATENT DOCUMENTS

| | | | |
|---|---|---|---|
| 4,974,093 | 11/1990 | Murayama et al. | 358/213.19 |
| 5,122,881 | 6/1992 | Nishizawa et al. | 358/212 |
| 5,401,952 | 3/1995 | Sugawa | 250/208.1 |

OTHER PUBLICATIONS

Japanese Laid-Open Patent Publication No. 4-360544, T. Kimura, Laid Open on Dec. 14, 1992.
Japanese Laid-Open Patent Publication No. 6-133227, H. Suzuki, Laid-Open on May 13, 1994.
Japanese Laid-Open Patent Publication No. 6-153086, E. Koyama, Laid Open on May 31, 1994.

*Primary Examiner*—Anderw I. Faile
*Assistant Examiner*—Christopher Onuaku
*Attorney, Agent, or Firm*—David G. Conlin; William J. Daley, Jr.

[57] ABSTRACT

A solid-state imaging device includes a plurality of photodiodes for generating signal charge by photoelectric conversion in response to incident light. The photodiodes are formed on a substrate in either a one-dimensional arrangement or a two-dimensional arrangement; a charge transfer section is formed on the substrate for receiving the signal charge from the photodiodes and for transferring the signal charge toward an output portion; and a charge-accumulating region is formed on the substrate for receiving the signal charge from the output portion of the charge transfer section and for accumulating the signal charge. A reset circuit for resetting a state of the charge-accumulating region in response to a reset signal includes a first MOS transistor formed on the substrate, the first MOS transistor having a source connected to the charge-accumulating region, a drain supplied with a drain voltage for removing the signal charge, and a gate for connecting the source to the drain in response to the reset signal. Finally, a voltage generation circuit includes at least a second MOS transistor formed on the same substrate, the second MOS transistor serving as a first diode between the gate and the drain of the first MOS transistor. The voltage generation circuit generates a first forward voltage of the first diode in response to the reset signal, and applies the first forward voltage between the gate and the drain of the first MOS transistor.

9 Claims, 12 Drawing Sheets

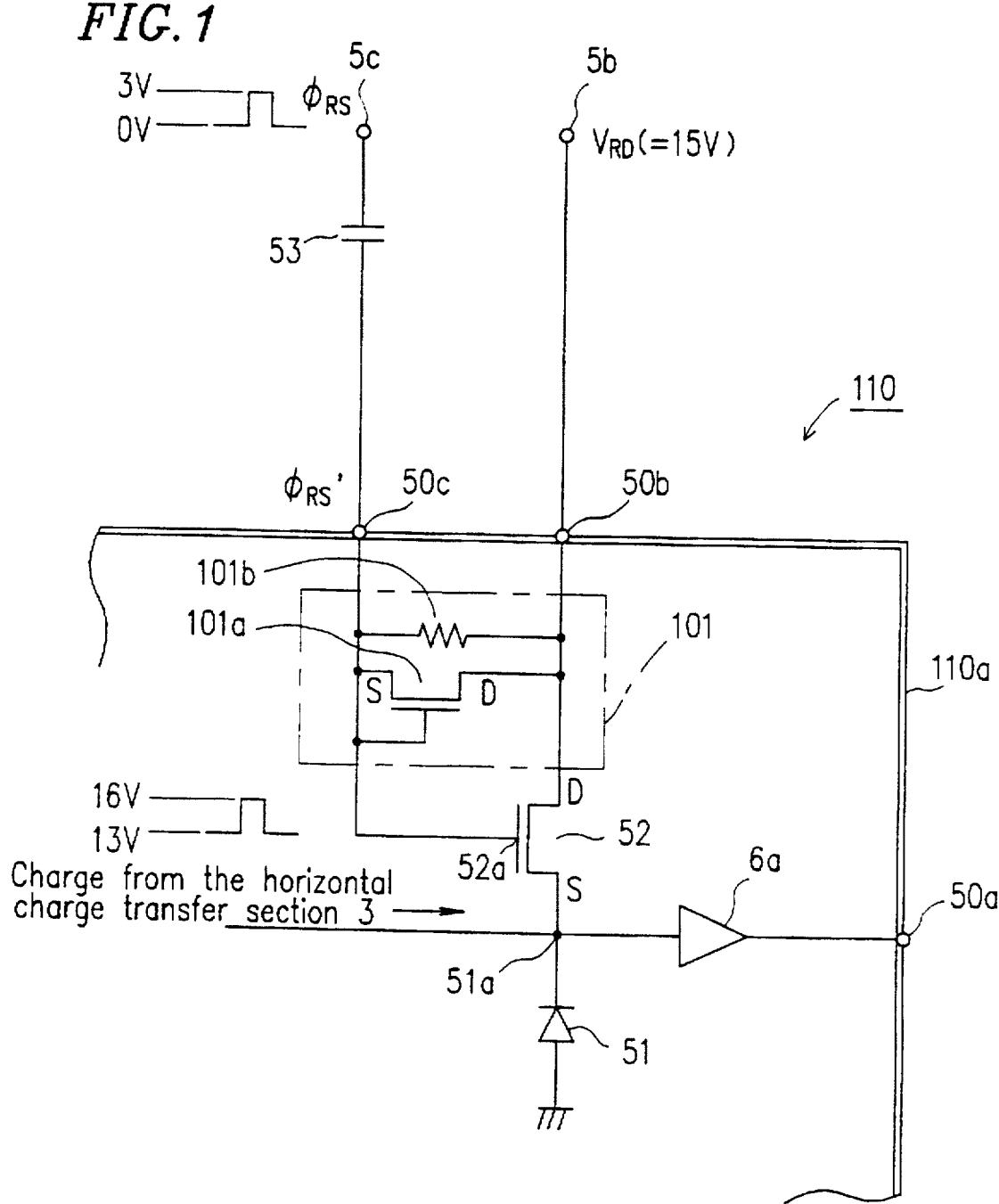

SOLID-STATE IMAGING DEVICE

BACKGROUND OF THE INVENTION

1. Field of the Invention

The present invention relates to a solid-state imaging device used in a camera system such as a video camera, a monitoring camera, a security monitoring camera, a camera to be mounted in a vehicle, a camera for a video phone, or a camera for a multi-media device; and in particular, the present invention relates to a solid-state imaging device such as a CCD which contributes to reductions in size, weight, production cost and power consumption.

2. Description of the Related Art

Solid-state imaging devices which are used generally today operate in the following manner. Signal charge which is transferred from a horizontal charge transfer section is converted into a voltage by a floating diode and is sent to an output circuit. After the charge-to-voltage conversion, unnecessary signal charge is released via a drain in a reset transistor by applying a reset gate clock to the reset transistor. The floating diode is a diffusion layer having a floating potential.

With reference to FIGS. 10A and 10B, a conventional solid-state imaging device 200 will be described. FIG. 10A is a plan view of a CCD chip 200a included in the conventional solid-state imaging device 200. FIG. 10B is a circuit diagram of a charge-to-voltage converter 5 of the CCD chip 200a and the vicinity thereof.

As shown in FIG. 10A, the solid-state imaging device 200 includes the CCD chip 200a for dividing light from an object into optical signals corresponding to a plurality of pixels, converting each of the resultant optical signals into an electric signal, and then transferring the electric signal to an external device.

The CCD chip 200a includes a plurality of photodiodes 1 arranged in a matrix (i.e., in rows and columns) on an n-type substrate 10 for converting incident light into an electric charge and accumulating the resultant electric charge. The CCD chip 200a further includes a plurality of vertical charge transfer sections 2 each provided in correspondence with a column of photodiodes 1 for vertically transferring the charge accumulated in the photodiodes 1 and a horizontal charge transfer section 3 for horizontally transferring the charge sent from the vertical charge transfer sections 2. The CCD chip 200a further includes a charge-to-voltage converter 5 electrically connected to an output of the horizontal charge transfer section 3 for converting the charge sent from the horizontal charge transfer section 3 into a voltage, and an output circuit 6 electrically connected to an output of the charge-to-voltage converter 5 for reducing an output impedance. Usually, the charge-to-voltage converter 5 has a multiple-stage source follower structure. A transfer gate 4 is provided between each photodiode 1 and the corresponding vertical charge transfer section 2 for transferring the charge accumulated in the photodiode 1 to the vertical charge transfer section 2.

As shown in FIG. 10B, the charge-to-voltage converter 5 includes a floating diode 51 having a charge-accumulating region 51a formed on the n-type substrate 10 for accumulating the charge transferred from the horizontal charge transfer section 3, and a reset transistor 52 for releasing the accumulated charge. The charge-accumulating region 51a has a floating potential, which changes in accordance with the amount of the charge accumulated therein. The output circuit 6 includes an amplifier 6a for amplifying the potential of the charge-accumulating region 51a and outputting the resultant potential to an output terminal 50a of the solid-state imaging device 200 as an image signal.

The reset transistor 52 includes a source connected to the charge-accumulating region 51a, a gate connected to a signal terminal 50c, and a drain connected to a signal terminal 50b. The signal terminal 50c is supplied with a reset gate clock $\phi_{RS}$ from a terminal 5c via a capacitor 53, and the signal terminal 50b is supplied with a reset drain voltage $V_{RD}$ (a DC voltage externally provided to the drain of the reset transistor 52 for releasing the charge) from a terminal 5b.

Between the terminal 5b and the ground, resistors R1 and R2 having partial resistances (also indicated by R1 and R2) are connected in series so as to generate a DC bias voltage $V_{BS}$ at the connection point of the resistors R1 and R2. A diode 54 is connected between the connection point and the signal terminal 50c wherein the direction from the connection point to the signal terminal 50c is designated as the forward direction.

The reset drain voltage $V_{RD}$ to be applied to the drain of the reset transistor 52 is a DC voltage of, for example, 15 V. To the gate of the reset transistor 52, a gate pulse $\phi_{RS}'$ obtained by superimposing the DC bias voltage $V_{BS}$ on the reset gate clock $\phi_{RS}$ is generally applied. The reset gate clock $\phi_{RS}$ has a "high" level of about 5 V and a "low" level of about 0 V.

FIG. 15 shows the relationship between the reset gate clock $\phi_{RS}$ and the gate pulse $\phi_{RS}'$. For example, when $V_{RD}$=15 V, R1=10 kΩ, and R2=20 kΩ; $V_{BS}$=10 V. When the "high" level of the reset gate clock $\phi_{RS}$ is 5 V and the "low" level thereof is 0 V under such conditions, the amplitude of the gate pulse $\phi_{RS}'$ is 9.5 V to 14.5 V when the forward voltage of the diode 54 is up to 0.5 V.

The resistors R1 and R2 and the diode 54 can be integrally incorporated in the CCD chip 200a but are preferably provided externally for the following reasons: (1) An internal DC bias voltage $V_{BS}$ is generated by the partial resistances R1 and R2 in a diffusion layer having a low impurity concentration in order to reduce the power consumption. If the concentration in the diffusion layer changes as a result of fluctuation in various fabrication process parameters, the value of the internal DC bias voltage $V_{BS}$ also changes. (2) The diode 54 is fabricated by a bipolar process, and the CCD chip 200a is basically fabricated by a MOS process. Combining these two processes to form the diode 54 on the CCD chip 200a complicates the fabrication method. Although a transistor formed by a MOS process can be used as the diode 54, the value of internal DC bias voltage $V_{BS}$ is still individually different as a result of fluctuation in fabrication process parameters.

With reference to FIGS. 11 and 12A through 12C, release of unnecessary charge which is performed after the charge-to-voltage conversion will be described.

FIG. 11 is a timing diagram of a gate clock pulse $\phi_{H1}$ of the horizontal charge transfer section 3 and the gate pulse $\phi_{RS}'$ applied to the gate 52a of the reset transistor 52 for releasing the accumulated charge. FIGS. 12A through 12C show potentials of an area including an output portion of the horizontal charge transfer section 3 and the reset transistor 52 shown in FIG. 11 at time $t_1$, $t_2$ and $t_3$, respectively.

As shown in FIGS. 12A through 12C, the gate clock pulse $\phi_{H1}$ is applied to two horizontal charge transfer gates 3a and 3b of the horizontal charge transfer section 3. The horizontal charge transfer gates 3a and 3b are adjacent to each other, and a semiconductor region below the transfer gate 3a contains boron implanted therein. In general, regions below two adjacent horizontal gates (3a and 3b in this case) have a potential gradient in this manner. Adjacent to the gate 3b, an output gate 7 to be supplied with a constant DC voltage $V_{OG}$ (for example, 1 V to 2 V) is provided. Between the output gate 7 and the reset transistor 52, the charge-accumulating region 51a of the floating diode 51 is provided.

At time $t=t_1$, charge Ch is accumulated in the horizontal charge transfer section 3 as shown in FIG. 12A. At time $t=t_2$ (FIG. 12B), charge Ch is transferred to the charge-accumulating region 51a through a region under the output gate 7. The potential level of the charge-accumulating region 51a changes in accordance with the amount of charge Ch transferred thereto, and such change is detected and output to the output circuit 6. At $t=t_3$ (FIG. 12C), the charge is released via the drain of the reset transistor 52. At this point, the potential level of the charge-accumulating region 51a is fixed to the level of the reset drain voltage $V_{RD}$.

The DC bias voltage $V_{BS}$ to be superimposed on the reset gate clock $\phi_{RS}$ is set to be sufficiently high to turn on the reset transistor 52 when the reset gate clock $\phi_{RS}$ becomes "high".

For example, where the reset drain voltage $V_{RD}$ is 15 V and the minimum level of the gate pulse $\phi_{RS}'$ for turning on the reset transistor 52 (threshold voltage) is $V_t$, the DC bias voltage $V_{BS}$ needs to be $(V_t-5.0)$ V. The amplitude of the reset gate clock $\phi_{RS}$ is 0 to 5.0 V. The DC voltage $V_{BS}$ is determined by the level of the drain reset voltage $V_{RD}$ and the characteristics of the reset transistor 52, (namely, the threshold level of the reset transistor 52 and the body effect).

In practice, however, the reset drain voltage $V_{RD}$ changes, and the characteristics of the reset transistor 52 are individually different as a result of fluctuation in fabrication process parameters. In general, the DC bias voltage $V_{BS}$ is determined in consideration of such change and fluctuation in order to guarantee accurate resetting. Accordingly, the DC bias voltage $V_{BS}$ to be superimposed on the reset gate clock $\phi_{RS}$ is generally set to be about 1 V higher than $(V_t-5.0)$ V.

FIGS. 13A through 13D are views showing potential levels of the charge-accumulating region 51a of the floating diode 51 (indicated by "FD region"), the region below the gate 52a of the reset transistor 52, namely, the channel region (indicated by "RG region"), and the drain region of the reset transistor 52 (indicated by "RD region") in the state of accumulating no charge. In FIGS. 13A through 13D, $p(\phi_{RS}'L)$ represents a potential level of the RG region obtained when the gate pulse $\phi_{RS}'$ is "low", $p(\phi_{RS}'H)$ represents a potential level of the RG region obtained when the gate pulse $\phi_{RS}'$ is "high", and $P(V_{RD})$ represents a potential level of the RD region obtained when the reset drain voltage $V_{RD}$ is applied.

FIG. 13A shows the potential levels in the ideal state. In the ideal state, when the "high" level of the gate pulse $\phi_{RS}'$ is applied to the gate of the reset transistor 52, the potential level of the RG region (channel potential) is equal to the potential level of the RD region in the state of being supplied with the reset drain voltage $V_{RD}$.

FIG. 13B shows the potential levels in the case where the reset drain voltage $V_{RD}$ externally supplied is increased by $\Delta V_1$. In such a case, the potential levels in the FD region and the RD region also increase by $\Delta V_1$. Accordingly, even if the "high" level of the gate pulse $\phi_{RS}'$ applied to the gate of the reset transistor 52 is the same, unnecessary charge cannot be released completely (defective resetting), thus degrading the image quality.

FIG. 13C shows the potential levels in the case where the threshold voltage $V_t$ of the reset transistor 52 increases by $\Delta V_2$ as a result of fluctuation in fabrication process parameters. In such a case, even if the gate pulse $\phi_{RS}'$ is the same, the channel potential is lower than the channel potential in the ideal state by $\Delta V_2$. Accordingly, unnecessary charge cannot be released completely (defective resetting), thus degrading the image quality.

In order to avoid such degrading of the image quality, the DC bias voltage $V_{BS}$ to be superimposed on the reset gate clock $\phi_{RS}$ is set to be higher than the DC bias voltage $V_{BS}$ in the ideal state by about 1 V, in consideration of the change $\Delta V_1$ of the reset drain voltage $V_{RD}$ and the change $\Delta V_2$ in the threshold voltage $V_t$. FIG. 13D shows the potential levels in such a case. The DC bias voltage $V_{BS}$ is higher than that in the ideal state by about 1 V although there is a s light difference depending on the fabrication process conditions.

Such adjustment also has a drawback. When the reset drain voltage $V_{RD}$ decreases and further the threshold voltage $V_t$ of the reset transistor 52 decreases as a result of fluctuation in fabrication process parameters, the amount of charge which can be accumulated in the charge-accumulating region 51a is reduced.

FIG. 14A is a view showing the amount of charge which can be accumulated in the charge-accumulating region 51a in the case where the DC bias voltage $V_{BS}$ is set to be higher than the level in the ideal state about 1 V. FIG. 14B shows the amount of charge which can be accumulated when the DC bias voltage $V_{BS}$ is set as shown in FIG. 14A and the drain reset voltage $V_{RD}$ and the threshold voltage $V_t$ both decrease to cause a drop of about 1 V in the DC bias voltage $V_{BS}$.

In general, when a DC bias voltage $V_{BS}$ increases in order to avoid defective resetting, the amount of charge which can be accumulated in the charge-accumulating region 51a is reduced by the influence of the "low" level of the gate pulse $\phi_{RS}'$.

From the point of the amount of charge which can be accumulated in the charge-accumulating region 51a, a maximum of about 2 V in the amplitude of the voltage is lost due to the change in the reset drain voltage $V_{RD}$ and the fluctuation in fabrication process parameters. Namely, the effective amplitude of the 5 V gate pulse $\phi_{RS}'$ is only 3 V.

As appreciated from the above description, in the conventional solid-state imaging device, even if the gate pulse $\phi_{RS}'$ to be applied to the reset transistor 52 has an amplitude of 5 V, the effective amplitude is only about 3 V. In other words, the gate pulse requires an amplitude of 5 V where only 3 V is required if resetting is performed in the ideal state.

SUMMARY OF THE INVENTION

A solid-state imaging device includes a plurality of photodiodes for generating signal charge by photoelectric conversion in response to incident light. The photodiodes are formed on a substrate in either a one-dimensional arrangement or a two-dimensional arrangement; a charge transfer section is formed on the substrate for receiving the signal charge from the photodiodes and for transferring the signal charge toward an output portion; and a charge-accumulating region is formed on the substrate for receiving the signal charge from the output portion of the charge transfer section and for accumulating the signal charge. A reset circuit for resetting a state of the charge-accumulating region in response to a reset signal includes a first MOS transistor formed on the substrate, the first MOS transistor having a source connected to the charge-accumulating region, a drain supplied with a drain voltage for removing the signal charge, and a gate for connecting the source to the drain in response to the reset signal. Finally, a voltage generation circuit includes at least a second MOS transistor formed on the same substrate, the second MOS transistor serving as a first diode between the gate and the drain of the first MOS transistor. The voltage generation circuit generates a first forward voltage of the first diode in response to the reset signal, and applies the first forward voltage between the gate and the drain of the first MOS transistor.

In one embodiment of the invention, the voltage generation circuit further includes a third MOS transistor serving as a second diode for forming a second forward voltage, and generates a voltage to be applied to the drain of the first MOS transistor utilizing the first and second forward voltages of the first and second diodes.

In one embodiment of the invention, the second MOS transistor has a source connected to the gate of the first MOS transistor, a drain connected to the drain of the first MOS transistor, and a gate connected to the source of the second MOS transistor; the gate and the source of the second MOS transistor are externally supplied with a reset clock via a capacitor; and the drain of the second MOS transistor is externally supplied with a reset drain voltage.

In one embodiment of the invention, the voltage generation circuit further includes a resistor connecting the source of the second MOS transistor and the drain of the second MOS transistor.

In one embodiment of the invention, a gate and a source of the third MOS transistor are externally supplied with a voltage for releasing the charge; and a drain of the third MOS transistor is connected to the gate and source of the second MOS transistor and to the gate of the first MOS transistor. The drain of the third MOS transistor is externally supplied with a reset clock via a capacitor.

In one embodiment of the invention, the voltage generation circuit further includes a fourth MOS transistor serving as a third diode for forming a third forward voltage. The fourth MOS transistor generates a voltage to be applied to the drain of the first MOS transistor utilizing the forward voltages of the first, second and third diodes.

In one embodiment of the invention, the second MOS transistor has the same threshold level as the first MOS transistor.

In one embodiment of the invention, the second MOS transistor has the same structure as the first MOS transistor.

In one embodiment of the invention, the first and second MOS transistors are simultaneously formed by the common fabrication process steps.

Thus, the invention described herein makes possible the advantages of providing a solid-state imaging device in which a change in channel potential of the reset transistor caused by a pulse applied to the gate thereof is maintained at the same level with no influence of the voltage applied to the drain of the reset transistor or the threshold voltage of the reset transistor, thus avoiding wasting the voltage applied to the gate of the reset transistor and realizing lower power consumption.

These and other advantages of the present invention will become apparent to those skilled in the art upon reading and understanding the following detailed description with reference to the accompanying figures.

BRIEF DESCRIPTION OF THE DRAWINGS

FIG. 1 is a circuit diagram of a solid-state imaging device in a first example according to the present invention;

DESCRIPTION OF THE PREFERRED EMBODIMENTS

Figure 10A:
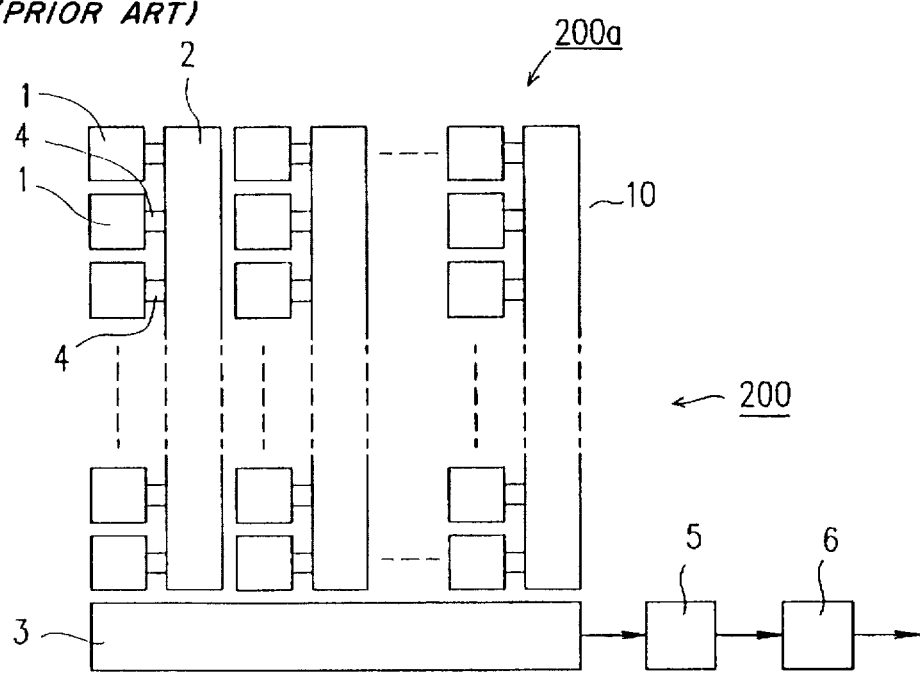
FIG. 10A is a plan view of a conventional solid-state imaging device.
Figure 10B:
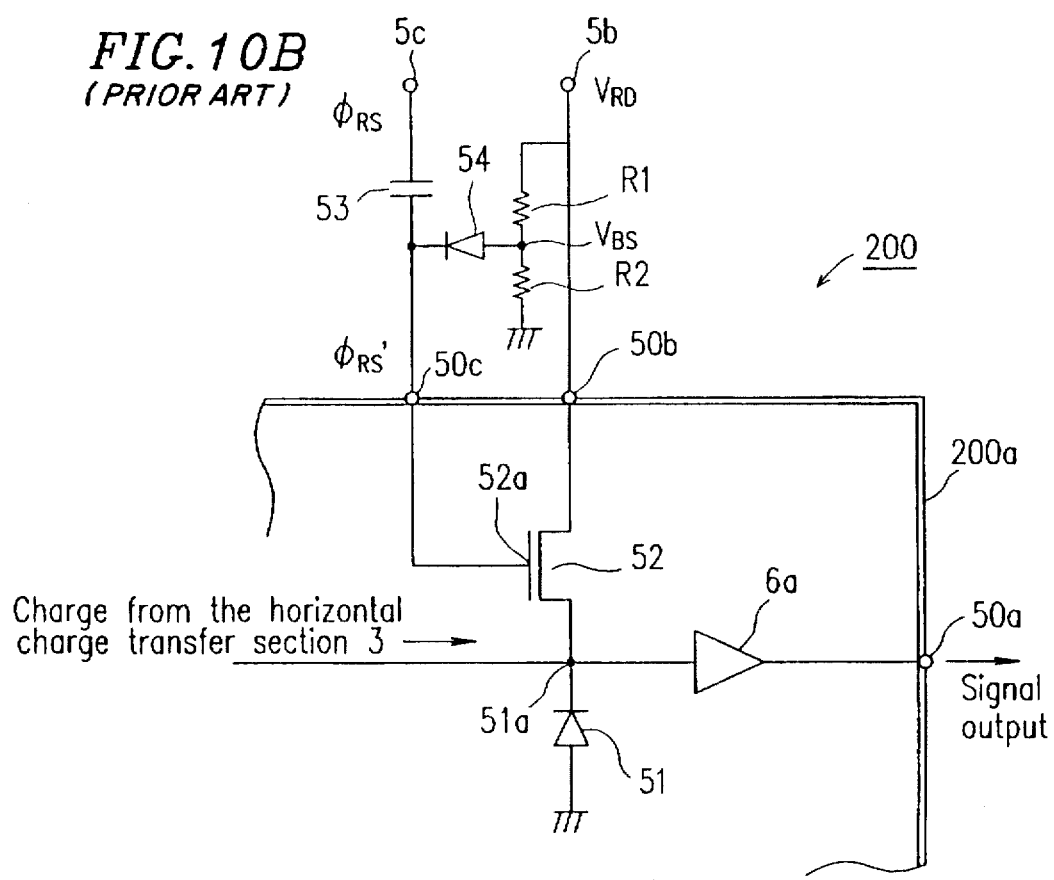
FIG. 10B is a circuit diagram of the conventional solid-state imaging device shown in FIG. 10A.
Figure 11:
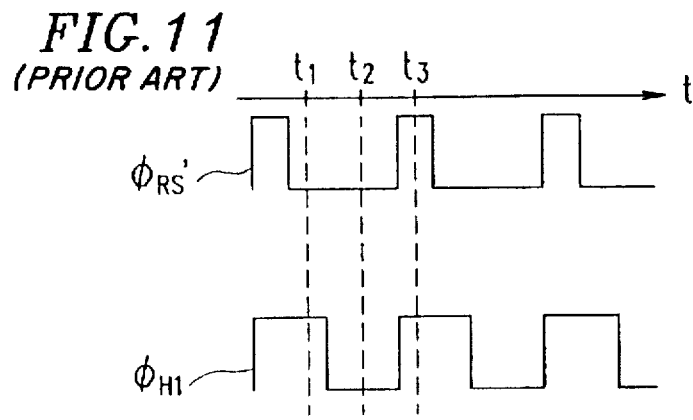
FIG. 11 is a timing diagram illustrating reset operation of the conventional solid-state imaging device shown in FIG. 10A.
Figure 12A:
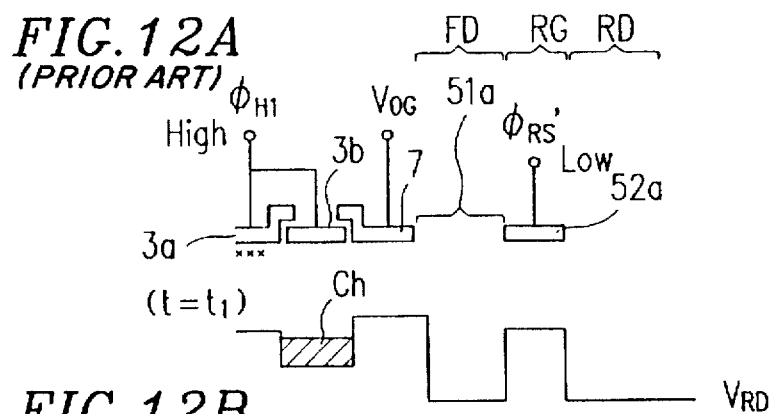
FIGS. 12A through 12C illustrate potentials in the conventional solid-state imaging device shown in FIG. 10A at different times.
Figure 12B:
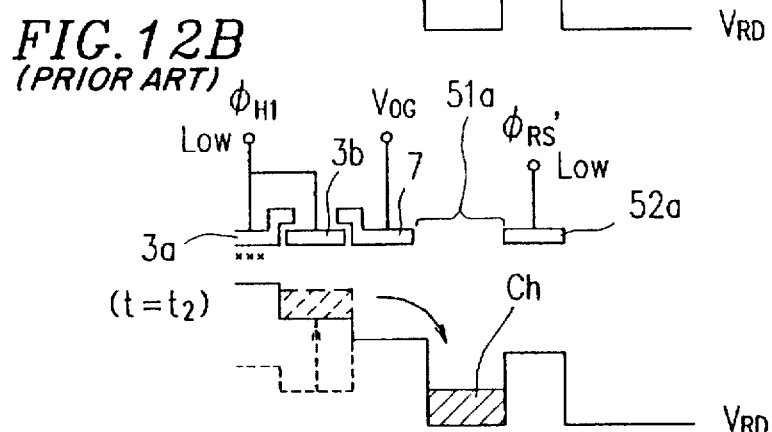
Figure 12C:
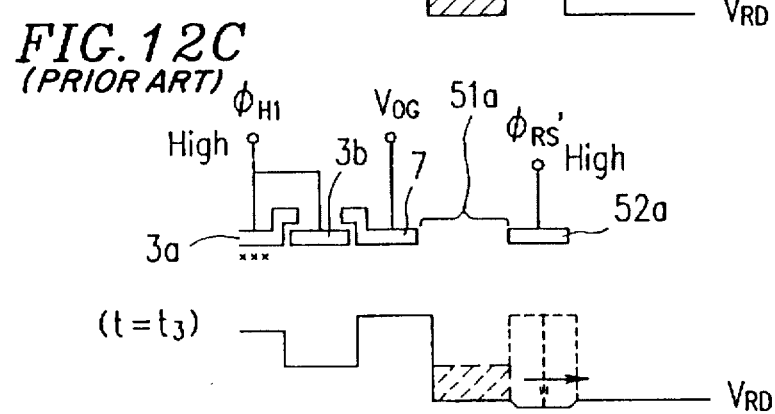

The basic principle of the present invention will be described with reference to FIG. 1. Identical elements as those in the conventional solid-state imaging device 200 in FIGS. 10A and 10B will bear identical reference numerals therewith.

FIG. 1 is a circuit diagram of a solid-state imaging device 100 according to the present invention.

A solid-state imaging device 110 according to the present invention includes a voltage generation circuit 101. The solid-state imaging device 110 includes a CCD chip 110a, which includes a voltage generation circuit 101 in lieu of both the diode 54 for generating a DC bias voltage $V\phi_{BS}$ and the resistors $R_1$ and $R_2$. The voltage generation circuit 101 includes a voltage generation transistor (MOS transistor) 101a acting as a diode and a resistor 101b connected parallel to the voltage generation transistor 101a. The voltage generation transistor 101a has the same structure as the reset transistor 52 which is provided on the same substrate.

Due to such a structure, the potential difference between the gate pulse $\phi_{RS}'$ applied to the gate 52a of the reset transistor 52 and a reset drain voltage $V_{RD}$ externally applied to the drain of the reset transistor 52 is maintained at a voltage corresponding to the threshold voltage ($V_t$) of the voltage generation transistor 101a.

In such a structure, even if the reset drain voltage $V_{RD}$ changes in accordance with fluctuation in a supply voltage, the gate pulse $\phi_{RS}'$ is constantly maintained at a potential which is higher than the reset drain voltage $V_{RD}$ by the threshold voltage ($V_t$) of the voltage generation transistor 101a. When the channel potential of the reset transistor 52 changes as a result of fluctuation in fabrication process parameters, the channel potential of the voltage generation transistor 101a also changes by the same level. In other words, the change in the channel potential of the reset transistor 52 is compensated for by a change in the threshold voltage of the voltage generation transistor 101a. This is because the reset transistor 52 and the voltage generation transistor 101a are formed on the same substrate by the same fabrication process.

Due to the gate pulse $\phi_{RS}'$ generated by the voltage generation transistor 101a and the reset drain voltage $V_{RD}$ applied to the drain of the reset transistor 52, the reset operation can be performed without being influenced by change in the reset drain voltage $V_{RD}$ or fluctuation in fabrication process parameters. As a result, the amplitude of the gate pulse $\phi_{RS}'$ to be applied to the gate of the reset transistor 52 can be reduced, and the circuit for generating the DC bias voltage $V_{BS}$ can be eliminated. Thus, the solid-state imaging device can be reduced in size, weight and production cost.

Japanese Laid-Open Patent Publication No. 4-360544 discloses a charge detector which operates properly merely by a level-sliced pulse which is constantly provided from an external device even if the channel potential of the reset transistor changes as a result of fluctuation in fabrication process parameters.

Figure 16A:
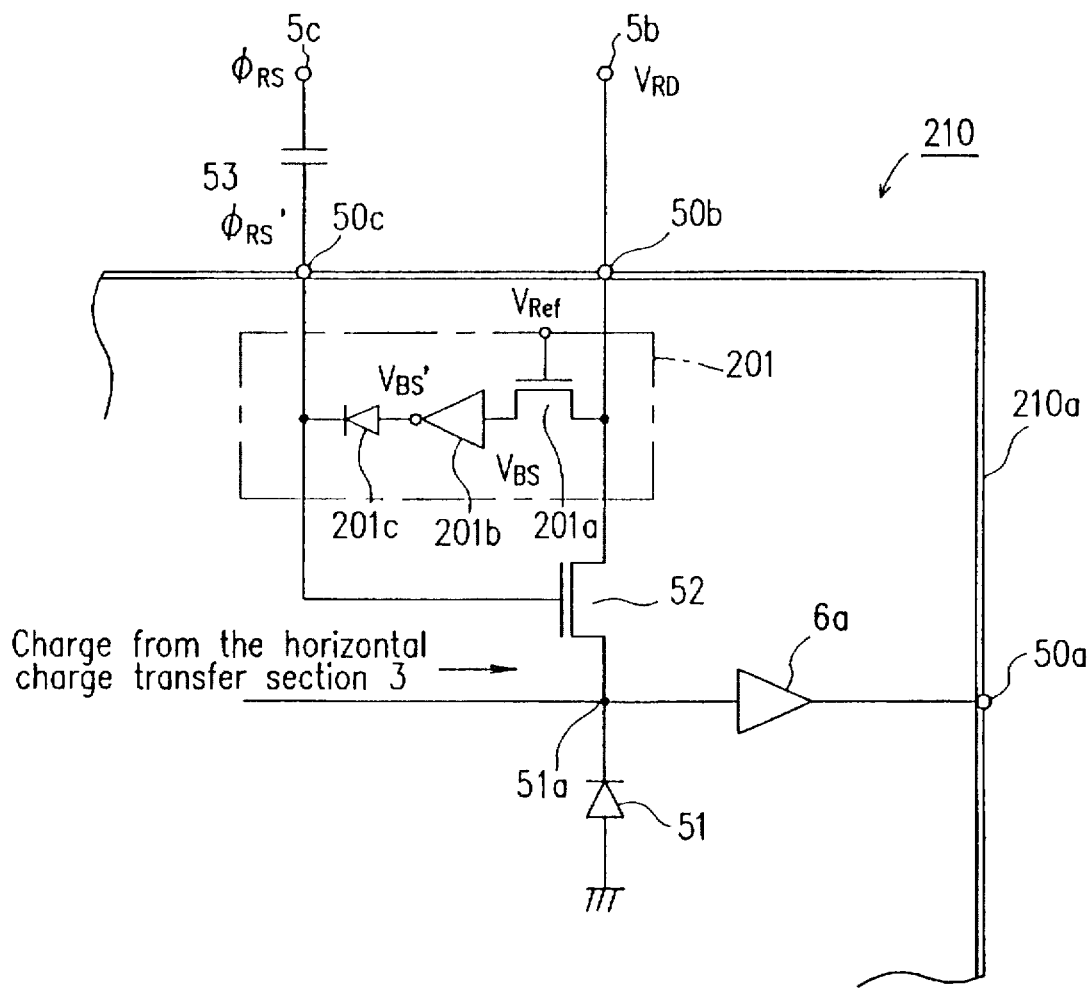
FIG. 16A is a circuit diagram of a conventional charge detector.
Figure 16B:
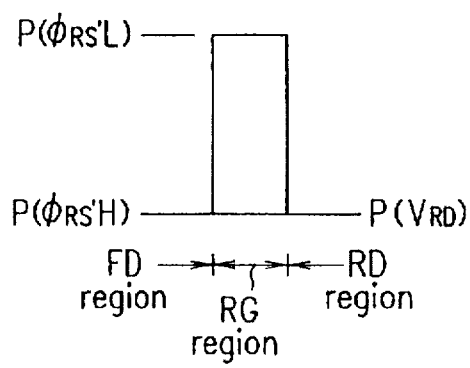
FIGS. 16B and 16C illustrate potentials in the conventional charge detector shown in FIG. 16A.
Figure 16C:
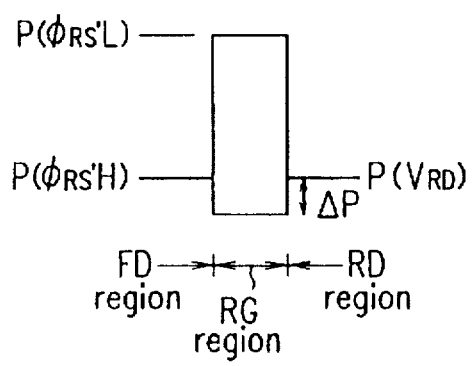

Such a charge detector 210 will be described with reference to FIGS. 16A through 16C. FIG. 16A is a circuit diagram of the charge detector 210. FIG. 16B illustrates the potential of the drain region and the channel potential obtained when the gate pulse $\phi_{RS}'$ is applied in the state where the channel potential does not change as a result of fluctuation in fabrication process parameters. FIG. 16C illustrates such parameters in the state where the channel potential changes as a result of fluctuation in fabrication process parameters.

As shown in FIG. 16A, the charge detector 210 is formed on a CCD chip 210a. The CCD chip 210a includes a voltage generation circuit 201. The voltage generation circuit 201 includes a voltage generation transistor 201a having a drain connected to a signal terminal 50b and a gate connected to a DC reference voltage $V_{ref}$, an inverting amplifier 201b having an input connected to a source of the transistor 201a, and a diode 201c connected between the output of the inverting amplifier 201b and a signal terminal 50c. The signal terminal 50b is supplied with a reset drain voltage $V_{RD}$, and the signal terminal 50c is supplied with a reset gate clock $\phi_{RS}$ via the capacitor 53. The voltage generation transistor 201a is formed simultaneously in the same process and has the same structure as the reset transistor 52.

The DC reference voltage $V_{ref}$ is set to such a level as to generate DC bias voltages $V_{BS}$ and $V_{BS}'$ at the input and the output of the inverting amplifier 201b. The DC bias voltages $V_{BS}$ and $V_{BS}'$ each have such a level as to turn on the transistor 201a in the state of being supplied with a reset drain voltage $V_{RD}$ when the gate pulse $\phi_{RS}'$ is "high". In such a state, as shown in FIG. 16B, the channel potential $P(\phi_{RS}'H)$ obtained when the gate pulse $\phi_{RS}'$ is "high" is equal to the potential $P(V_{RD})$ of the drain region of the reset transistor 52.

When the channel potential of the drain region of the reset transistor 52 increases by $\Delta P$ as a result of fluctuation in fabrication process parameters (FIG. 16C), the channel potential of the voltage generation transistor 201a also increases by $\Delta P$. Accordingly, the DC bias voltage $V_{BS}$ generated at the input of the inverting amplifier 201b also increases by $\Delta V_{BS}$, which corresponds to $\Delta P$.

At this point, the DC bias voltage $V_{BS}'$ generated at the output of the inverting amplifier 201b decreases by $\Delta V_{BS}$, and the level of the gate pulse $\phi_{RS}'$ also decreases by $\Delta V_{BS}$. Thus, the change $\Delta P$ in the channel potential can be counteracted.

In this structure, when the channel potential of the voltage generation transistor 201a changes as a result of fluctuation in fabrication process parameters, the DC bias voltage $V_{BS}$ generated by the voltage generation transistor 201a also changes. However, the direction of the change in the DC bias voltage $V_{BS}$ is the same as the direction of change in the channel potential of the reset transistor 52; namely, it is opposite to the direction of such change as to compensate for the channel potential of the reset transistor 52. Accordingly, the inverting amplifier 201b for inverting the DC bias voltage $V_{BS}$ generated by the voltage generation transistor 201a needs to be provided. Provision of the inverting amplifier 201b requires fluctuation in characteristics thereof to be considered when setting the reset gate clock $\phi_{RS}$.

According to the present invention, in contrast, a voltage generation transistor 101a used as a diode is connected between the gate and the drain of the reset transistor 52 so that the current flows from the gate to the drain in a forward direction. Accordingly, the gate pulse $\phi_{RS}'$ applied to the gate of the reset transistor 52 changes as the channel potential of the voltage generation transistor 101a changes in such a direction as to compensate for changes in the channel potential of the reset transistor 52. Due to such a structure, the inverting amplifier 201a is not necessary. Accordingly, the structure of the voltage generation circuit 201 is simplified, and thus the size and production cost of the solid-state imaging device 110 are reduced.

Furthermore, fluctuation in characteristics of the inverting amplifier 201b (especially, the voltage gain) need not be considered when setting the reset gate clock $\phi_{RS}$.

Japanese Laid-Open Patent Publication No. 6-133227 discloses a charge transfer device including a CCD chip which includes a voltage generation circuit.

Figure 17A:
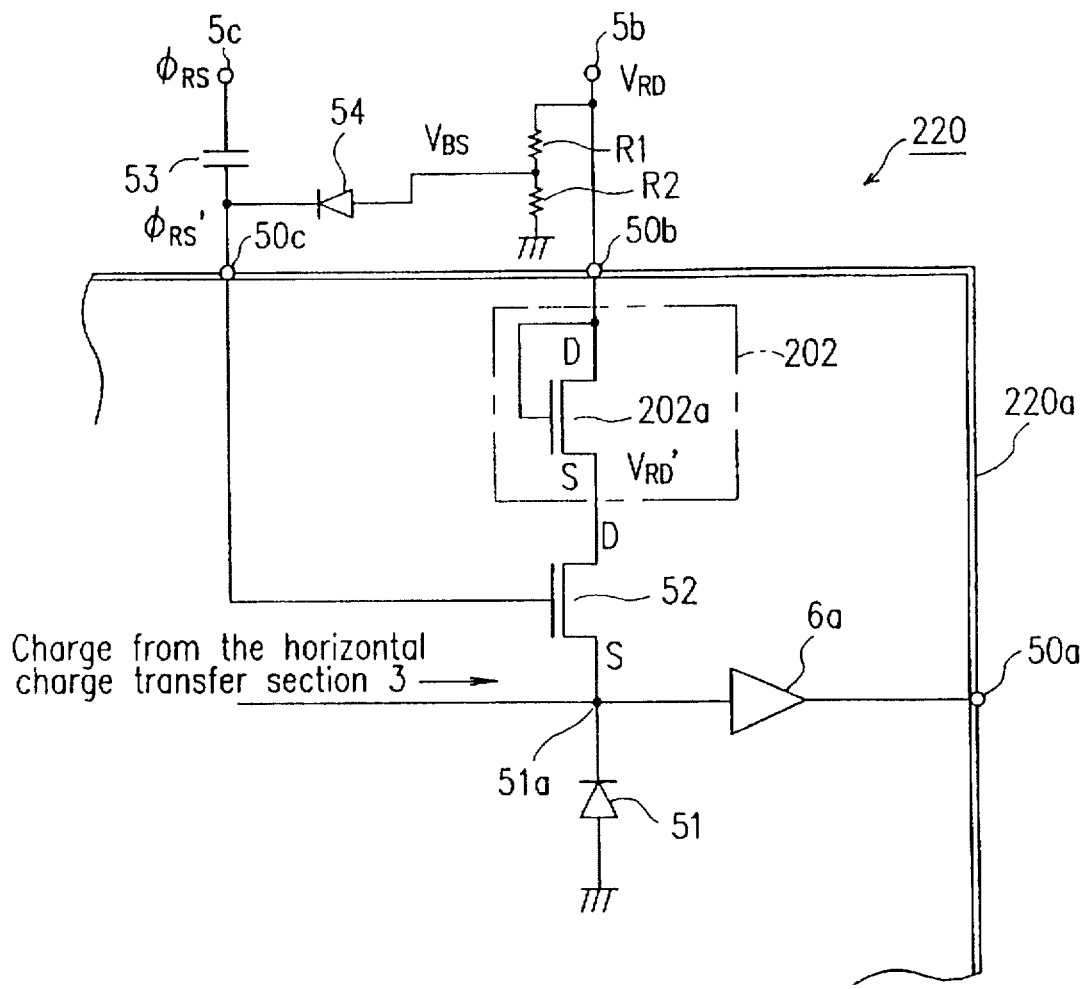
FIG. 17A is a circuit diagram of a conventional charge transfer device.
Figure 17B:
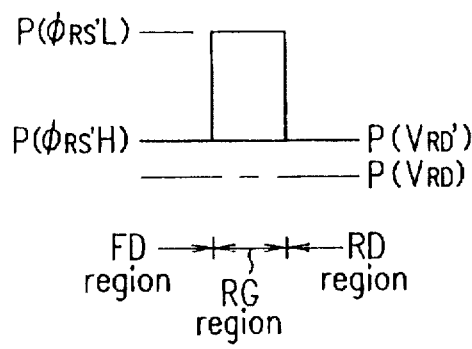
FIGS. 17B and 17C illustrate potentials in the conventional charge transfer device shown in FIG. 17A.
Figure 17C:
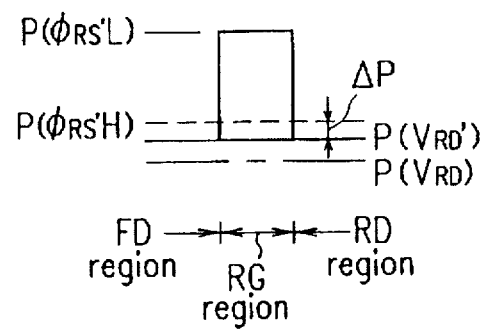

FIG. 17A is a circuit diagram of such a charge transfer device 220. FIG. 17B illustrates the potential of the drain region and the channel potential obtained when the gate pulse $\phi_{RS}'$ is applied in the state where the channel potential does not change as a result of fluctuation in fabrication process parameters. FIG. 17C illustrates such potentials in the state where the channel potential changes as a result of fluctuation in fabrication process parameters.

As shown in FIG. 17A, the charge transfer device 220 includes a CCD chip 220a. The CCD chip 220a includes a voltage generation transistor 202a provided between the reset transistor 52 and the signal terminal 50b. The signal terminal 50b is supplied with a reset drain voltage $V_{RD}$. The voltage generation transistor 202a is formed simultaneously in the same process and has the same structure as the reset transistor 52.

In such a structure, an output voltage $V_{RD}'$ (drain voltage) generated by the voltage generation circuit 202 is lower than the reset drain voltage $V_{RD}$ externally provided by the level of $V_t(V_{RD})$, which is a threshold voltage of the voltage generation transistor 202a.

In this state, the level of the DC bias voltage $V_{BS}$ to be superimposed on the reset gate clock $\phi_{RS}$ is set. Although there is no description of a circuit for generating the DC bias voltage $V_{BS}$ in the above-identified publication, there is no doubt that such a circuit is necessary in consideration of the description of the publication.

When the channel potential of the reset transistor 52 increases by $\Delta P$ as a result of fluctuation in fabrication process parameters (FIG. 17C), the potential of the drain region of the reset transistor 52 also increases by $\Delta P$.

Accordingly, even if the channel potential of the reset transistor 52 changes as a result of fluctuation in fabrication process parameters, the difference between the potential of the drain region and the channel potential of the reset transistor 52 in the state of being provided with either a "high" gate pulse $\phi_{RS}'$ or a "low" gate pulse $\phi_{RS}'$ can be maintained at a constant level.

However, as described above, such a structure of the charge transfer device 220 obviously requires the circuit for generating the DC bias voltage $V_{BS}$. Therefore, the structure of the charge transfer device 220 is complicated, and the size and production cost thereof are increased.

In the above-identified publication, it is described that the potential of the source region of the voltage generation transistor 202a is equal to the channel potential thereof. However, since the diffusion layer acting as the source region has a floating potential, the potential of the source region stabilizes at a level equal to the potential of the drain region, which is externally fixed, after thermal electrons are released. Accordingly, it is necessary to take some steps to maintain the potential of the source region at the same level as the channel potential.

One exemplary attempt to maintain the potential at such a level includes injecting charge from an external power supply, i.e., the drain region to the source region during a period in which CCD output is not necessary (for example, a horizontal blanking period). An application describing such a method has already been filed with the Japanese Patent Office by the inventors of the present invention (Japanese Patent Application No. 4-293524).

Hereinafter, the present invention will be described by way of illustrative examples with reference to the accompanying drawings.

EXAMPLE 1

FIG. 1 is a circuit diagram of a solid-state imaging device 110 in a first example according to the present invention.

The solid-state imaging device 110 is different from the conventional solid-state imaging device 200 in that a CCD chip 110a of the solid-state imaging device 110 includes a voltage generation circuit 101 in lieu of the diode 54 and the resistors $R_1$ and $R_2$ used for generating a DC bias voltage $V_{BS}$. The voltage generation circuit 101 is provided for receiving a reset gate clock $\phi_{RS}$ from an external device and generating a gate pulse $\phi_{RS}'$ to be applied to the gate of the reset transistor 52. Except for this point, the solid-state imaging device 110 has the same structure as the conventional solid-state imaging device 200.

The voltage generation circuit 101 includes a voltage generation transistor 101a having a drain connected to a drain of the reset transistor 52 and a source and a gate both connected to the gate of the reset transistor 52, and a resistor 101b connected between the drain and the gate of the reset transistor 52.

The signal terminal 50c is supplied with a reset gate clock $\phi_{RS}$ via the capacitor 53, and the signal terminal 50b is supplied with a reset drain voltage $V_{RD}$ to be applied to the common drain of the voltage generation transistor 101a and the reset transistor 52.

The resistor 101b is provided for charging the capacitor 53 to turn on the voltage generation transistor 101a which acts as a diode as described below and is in an inverse bias state in the initial state.

The voltage generation transistor 101a is produced simultaneously by the same process as the reset transistor 52, and thus has the same structure and characteristics as the reset transistor 52. The voltage generation transistor 101a is an N-channel type transistor acting as a diode, which has a positive threshold voltage.

In a general field-effect transistor, when the source voltage and drain voltage increase, the threshold voltage $V_t$ obtained when the source and drain voltages are 0 V also increases due to the body effect. The threshold voltage obtained when the source voltage is $V_S$ depends on the source voltage as appreciated from the fact that such a threshold voltage is represented as $V_t(V_S)$.

The threshold voltage of the voltage generation transistor 101a needs to fulfill the condition $V_t(V_{RD}) \geq 0$ but need not fulfill the condition $V_t(0) \geq 0$. In other words, the voltage generation transistor 101a needs to have a positive threshold voltage in the operational state in which a voltage is applied to the source, but does not have to be an enhancement type transistor fulfilling the condition $V_t(0) \geq 0$.

In the case when the gate and the source of the voltage generation transistor 101a are shortcircuited as shown in FIG. 1, the voltage generation transistor 101a is equivalent to a diode having the gate and the source connected to one terminal (terminal 50c in this case) and the drain connected to another terminal (terminal 50b in this case) because the threshold voltage is positive. Hereinafter, the voltage generation transistor 101a will also be referred to as a "diode 101a". The gate and source act as an anode collectively, and the drain acts as a cathode. The threshold voltage $V_t(V_{RD})$ of the voltage generation transistor 101a is the drop voltage of the diode 101a.

Figure 2A:
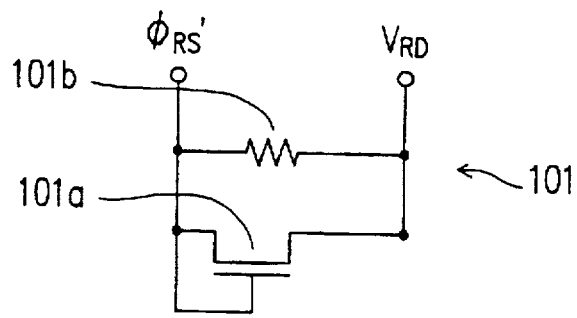
FIGS. 2A and 2B are equivalent circuit diagrams of a pulse generation circuit in the solid-state imaging device shown in FIG. 1.
Figure 2B:
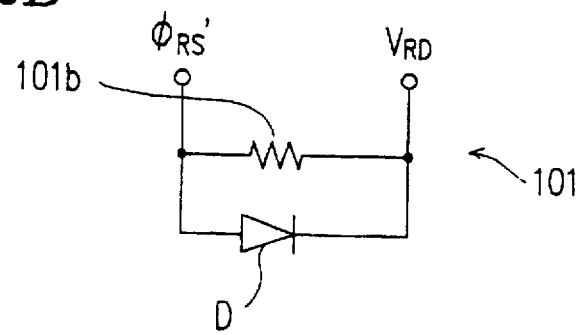
Figure 3:
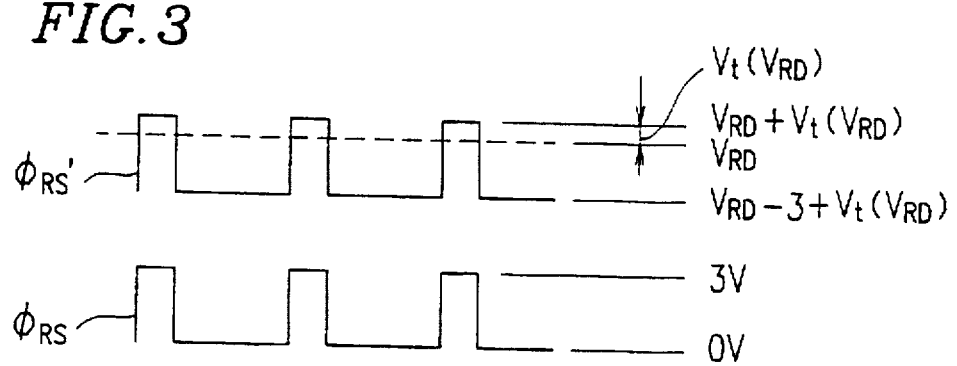
FIG. 3 is a timing diagram illustrating the relationship between a reset gate clock $\phi_{RS}$ and a gate pulse $\phi_{RS}'$ of the solid-state imaging device shown in FIG. 1.

FIG. 2A is an equivalent circuit diagram of the voltage generation circuit 101 with the voltage generation transistor 101a, and FIG. 2B is also an equivalent circuit diagram of the voltage generation circuit 101 which represents the voltage generation transistor 101a as a diode (D). FIG. 3 is a timing diagram illustrating the relationship between the reset gate clock $\phi_{RS}$ and the gate pulse $\phi_{RS}'$. The voltage generation circuit 101 having such a configuration operates in the following manner.

In the initial state, $\phi_{RS}' = \phi_{RS}$; i.e., the gate pulse $\phi_{RS}'$ has an amplitude equal to the reset gate clock $\phi_{RS}$. After a prescribed period of time, the capacitor 53 is charged via the resistor 101b, and therefore the reset drain voltage $V_{RD}$ (DC voltage) is added to the gate pulse $\phi_{RS}'$.

The diode 101a is connected between the signal terminal 50c to be supplied with the gate pulse $\phi_{RS}'$ and the signal terminal 50b to be supplied with the reset drain voltage $V_{RD}$. Due to such a structure, when the gate pulse $\phi_{RS}'$ becomes "high", the potential of the signal terminal 50c is stabilized at such a level as to turn on the diode 101a having the reset drain voltage $V_{RD}$ applied to the cathode thereof. If the resistance of the resistor 101b is sufficiently higher than the resistance of the capacitor 53 at this point, the gate pulse $\phi_{RS}'$ has an amplitude equal to the reset gate clock $\phi_{RS}$.

The gate pulse $\phi_{RS}'$ has an amplitude which is obtained by the following expression:

$$\text{amplitude of } \phi_{RS}' = W \times R/[R + 1/(2\pi fC)]$$

where W represents the amplitude of the reset gate clock $\phi_{RS}$, represents the capacity of the capacitor 53, f represents the reset frequency, and R represents the resistance of the resistor 101b.

Accordingly, when $R > 1/(2\pi fC)$, the amplitude of the gate pulse $\phi_{RS}'$ is substantially equal to the amplitude of the reset gate clock $\phi_{RS}'$. Where W=5 V, C≈50 pF, and f≈10 MHz, R>300Ω.

The resistor 101b, which has a relatively high resistance, can be formed by providing a thin diffusion layer on the substrate. Needless to say, the resistor 101b can be provided externally to the CCD chip 110a.

As appreciated from FIG. 3, the voltage of the gate pulse $\phi_{RS}'$ is stabilized at a level at which the ON-state current flowing to the drain of the reset transistor 52 when the reset gate clock $\phi_{RS}$ is "high" becomes equal to the leak current flowing from the drain when the reset gate clock $\phi_{RS}$ is "low". For example, where the reset drain voltage $V_{RD}$ is 15 V and the amplitude of the reset gate clock $\phi_{RS}$ is in the range of 0 V to 3 V, the gate pulse $\phi_{RS}'$ has an amplitude of 13 V to 16 V.

The voltage generation transistor 101a and the reset transistor 52 have the common drain and have the same structure. Therefore, when the gate pulse $\phi_{RS}'$ is "high", the channel potential of the voltage generation transistor 101a and the channel potential of the reset transistor 52 are both equal to or higher than the reset drain voltage $V_{RD}$. When the gate pulse $\phi_{Rs}'$ is "low", the channel potential of the voltage generation transistor 101a and the channel potential of the reset transistor 52 are both lower than the corresponding channel potentials obtained when the gate pulse $\phi_{RS}'$ is "high" by a value corresponding to the amplitude of the gate pulse $\phi_{RS}'$.

The voltage generation transistor 101a and the reset transistor 52 are fabricated simultaneously by the same process and have the same structure. Therefore, when the channel potential of one of the transistors with respect to the same gate pulse $\phi_{RS}'$ changes as a result of fluctuation in fabrication process parameters, the channel potential of the other transistor also changes by the same level. Therefore, the voltage generation transistor 101a and the reset transistor 52 always have an equal channel potential. Accordingly, a forward voltage of the voltage generation transistor 101a changes. By such change, the gate pulse $\phi_{RS}'$ applied to the gate of the reset transistor 52 changes so as to be counteracted by the change in the channel potential of the reset transistor.

Furthermore, the voltage generation transistor 101a and the reset transistor 52 have the common drain. Due to such a structure, even when the level of the reset drain voltage $V_{RD}$ applied to the drain changes, a gate pulse $\phi_{RS}'$ which is higher than the reset drain voltage $V_{RD}$ by a forward voltage of the voltage generation transistor 101a is applied to the gate of the reset transistor 52. In other words, the voltage generation transistor 101a generates a voltage for absorbing the differential level of the channel potential. Accordingly, the gate of the reset transistor 52 is always supplied with a voltage which is higher than the reset drain voltage by the forward voltage. For this reason also, the voltage generation transistor 101a and the reset transistor 52 always have an equal channel potential. Thus, accurate reset operation is always performed.

Figure 13A:
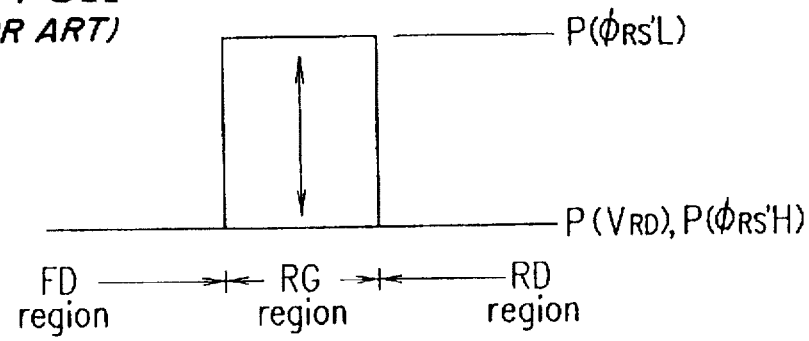
FIGS. 13A through 13D illustrate the potentials in the conventional solid-state imaging device shown in FIG. 10A in various states.
Figure 13B:
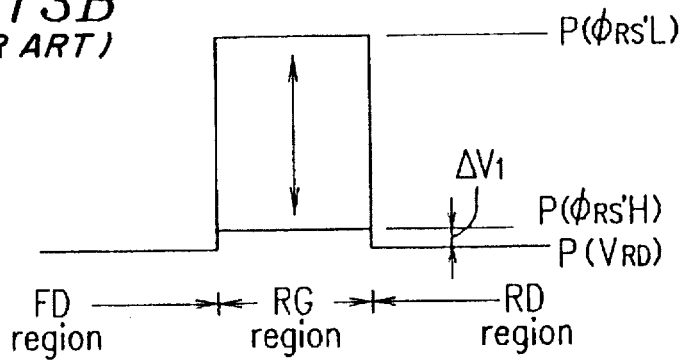
Figure 13C:
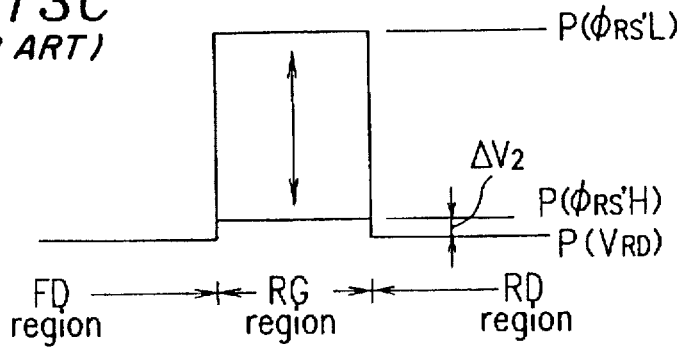
Figure 13D:
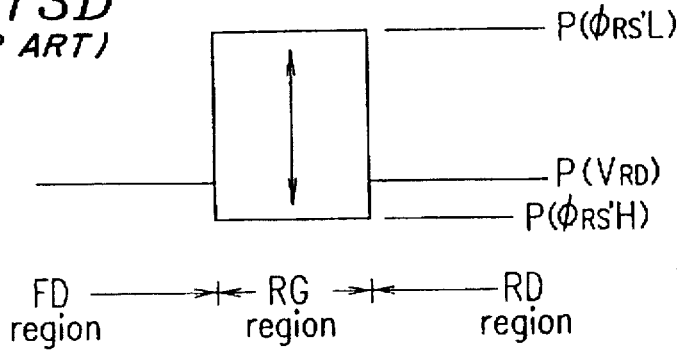
Figure 14A:
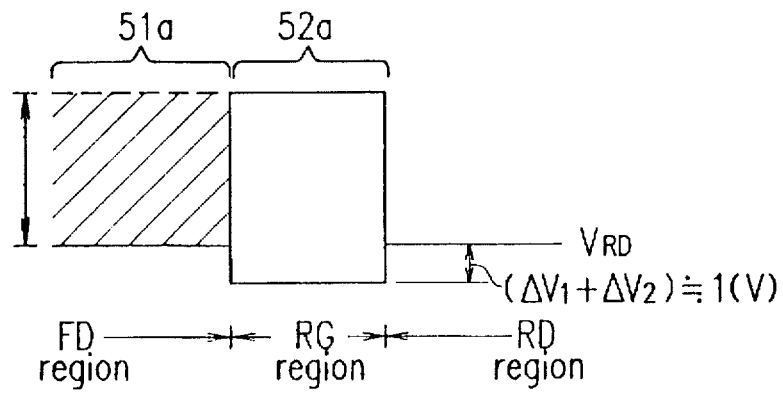
FIGS. 14A and 14B illustrate charges which can be accumulated in the floating diode of the conventional solid-state imaging device shown in FIG. 10A.
Figure 14B:
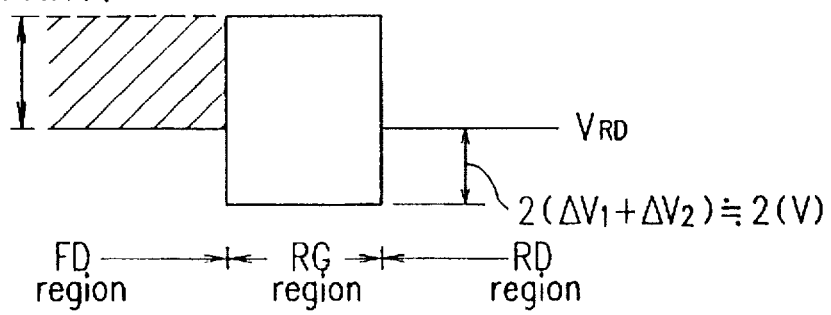
Figure 15:
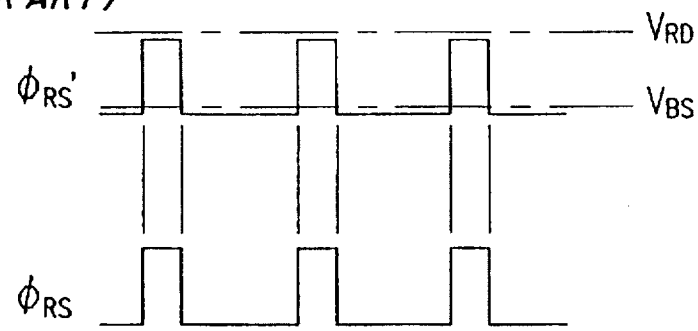
FIG. 15 is a diagram illustrating the relationship between a reset gate clock $\phi_{RS}$ and a gate pulse $\phi_{RS}'$ in the conventional solid-state imaging device shown in FIG. 10A.

Due to such a system, the ideal state shown in FIG. 13A is realized. The reset gate clock $\phi_{RS}$, which needs to have an amplitude of 5 V in the conventional solid-state imaging device, can have an amplitude of only about 3 V in order to obtain the same level of the gate pulse $\phi_{RS}'$ thus reducing the voltage and power consumption. Moreover, the circuit for generating a DC bias voltage $V_{BS}$ to be superimposed on the reset gate clock $\phi_{RS}$, which is required to be provided outside the CCD chip in the conventional solid-state imaging device, can be eliminated. Thus, the size, weight and production cost of the solid-state imaging device can be reduced.

EXAMPLE 2

Figure 4:
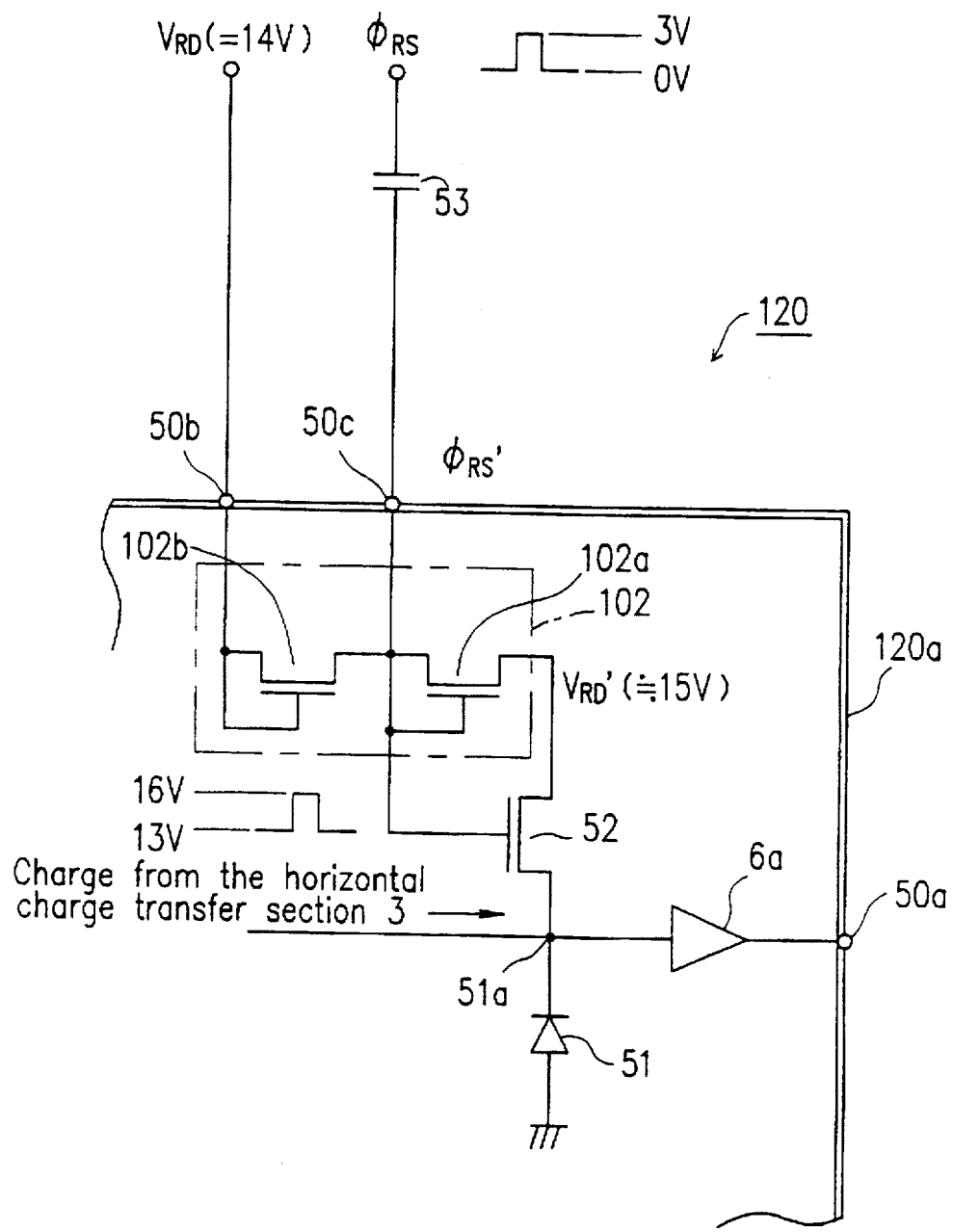
FIG. 4 is a circuit diagram of a solid-state imaging device in a second example according to the present invention.

FIG. 4 is a circuit diagram of a solid-state imaging device 120 in a second example according to the present invention.

The solid-state imaging device 120 is different from the solid-state imaging device 110 in the first example in that a CCD chip 120a of the solid-state imaging device 120 includes a voltage generation circuit 102 in lieu of the voltage generation circuit 101. The voltage generation circuit 102 is provided for receiving a reset gate clock $\phi_{RS}$ from an external device and a reset drain voltage $V_{RD}$ from an external power supply and generating a gate pulse $\phi_{RS}'$ to be applied to the gate of the reset transistor 52 and a drain voltage $V_{RD}'$ to be applied to the drain of the reset transistor 52. The drain of the reset transistor 52 is common with the drain of the first voltage generation transistor 102a. Except for this point, the solid-state imaging device 120 has the same structure as the solid-state imaging device 110. The drain voltage $V_{RD}'$ is generated based on the reset drain voltage $V_{RD}$ and the reset gate clock $\phi_{RS}$.

The voltage generation circuit 102 includes a first voltage generation transistor 102a and a second voltage generation transistor 102b. The first voltage generation transistor 102a has a source and a gate both connected to the signal terminal 50c together with the gate of the reset transistor 52 and a drain connected to the drain of the reset transistor 52. The second voltage generation transistor 102b has a source and a gate both connected to the signal terminal 50b and a drain connected to the signal terminal 50c. The signal terminal 50c is supplied with a reset gate clock $\phi_{RS}$ via the capacitor 53, and the signal terminal 50b is supplied with a reset drain voltage $V_{RD}$.

As shown in FIG. 4, each of the first and second voltage generation transistors 102a and 102b is an N-channel type transistor acting as a diode, which has a threshold voltage $V_t(V_{RD}) \geq 0$. Each of the first and the second voltage generation transistors 102a and 102b is shortcircuited. Hereinafter, the first and second voltage generation transistors 102a and 102b will also be referred to as "diodes 102a and 102b".

The first voltage generation transistor 102a is formed simultaneously by the same process and has the same structure as the reset transistor 52. The second voltage generation transistor 102b need not be a transistor formed by the same process and have the same structure as the reset transistor 52. As in the first example, the first voltage generation transistor 102a and the reset transistor 52, which are formed by the same process and have the same structure, always have the same channel potential. Thus, the reset drain voltage applied to the transistors 102a and 52 can be reduced.

Since the diode 102a is biased in a forward direction in the initial state, the resistor 101b connected parallel to the diode in the first example is not necessary.

Figure 5A:
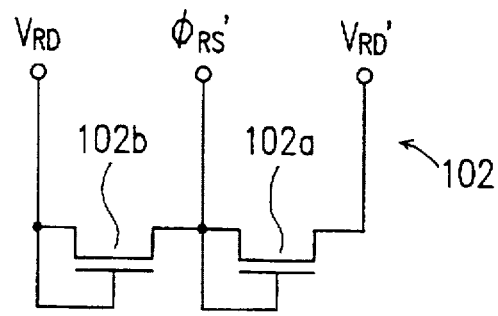
FIGS. 5A and 5B are equivalent circuit diagrams of a pulse generation circuit in the solid-state imaging device shown in FIG. 4.
Figure 5B:
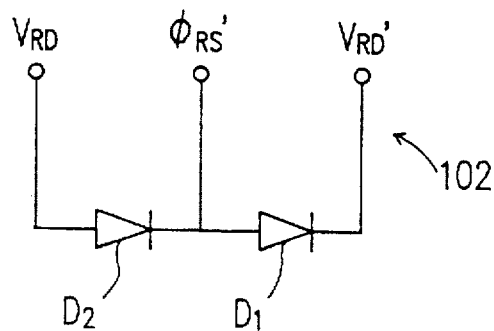
Figure 6:
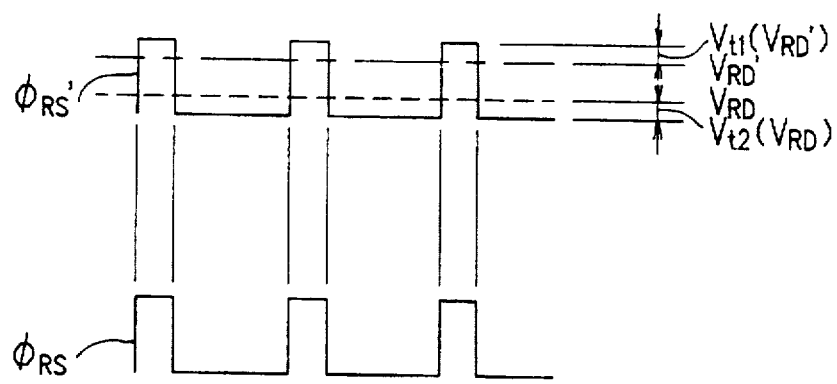
FIG. 6 is a timing diagram illustrating the relationship between a reset gate clock $\phi_{RS}$ and a gate pulse $\phi_{RS}'$ of the solid-state imaging device shown in FIG. 4.

FIG. 5A is an equivalent circuit diagram of the voltage generation circuit 102 with the first and second voltage generation transistors 102a and 102b, and FIG. 5B is also an equivalent circuit diagram of the voltage generation circuit 102 which represents the first and second voltage generation transistors 102a and 102b as diodes (D1 and D2). FIG. 6 is a timing diagram illustrating the relationship between the reset gate clock $\phi_{RS}$ and the gate pulse $\phi_{RS}'$. The drop voltages of the diodes D1 and D2 in the forward direction are equal to the threshold voltages $V_{t1}$ and $Vt_{t2}$ of the respective transistors 102a and 102b.

The solid-state imaging device 102 having such a structure operates in the following manner.

When the reset gate clock $\phi_{RS}$ becomes "high", a voltage which is higher than the reset drain voltage $V_{RD}$ by a value corresponding to the threshold voltage $V_t(V_{RD}')$ of the voltage generation transistor 102a is applied to the gate of the reset transistor 52. When the reset gate clock $\phi_{RS}$ becomes "low", a voltage which is lower than the gate voltage $\phi_{RS}'$ when the reset gate clock $\phi_{RS}$ is "high" by a value corresponding to the amplitude of the reset gate clock $\phi_{RS}$ is applied to the gate of the reset transistor 52.

The drain voltage $V_{RD}'$ is higher than the reset drain voltage $V_{RD}$. Accordingly, when the required level of drain voltage $V_{RD}'$ is equal to the level of the reset drain voltage $V_{RD}$ in the first example, the reset drain voltage $V_{RD}$ in the second example is lower than that in the first example by $3-|V_{t2}(V_{RD})+V_{t1}(V_{RD}')|$, where $V_{t2}(V_{RD})$ represents the threshold voltage for turning on the second voltage generation transistor 102b in the state where the reset drain voltage $V_{RD}$ is applied to the source, and $V_{t1}(V_{RD}')$ represents the threshold voltage for turning on the first voltage generation transistor 102a in the state where the drain voltage $V_{RD}'$ is applied to the drain. Thus, the reset drain voltage $V_{RD}$, which usually needs to be relatively high, can be reduced. For example, when the reset drain voltage $V_{RD}$ is 14 V, the drain voltage $V_{RD}'$ is about 15 V. The position at which the gate pulse $\phi_{RS}'$ is applied to the gate of the reset transistor 52 is the same as in the first example.

EXAMPLE 3

Figure 7:
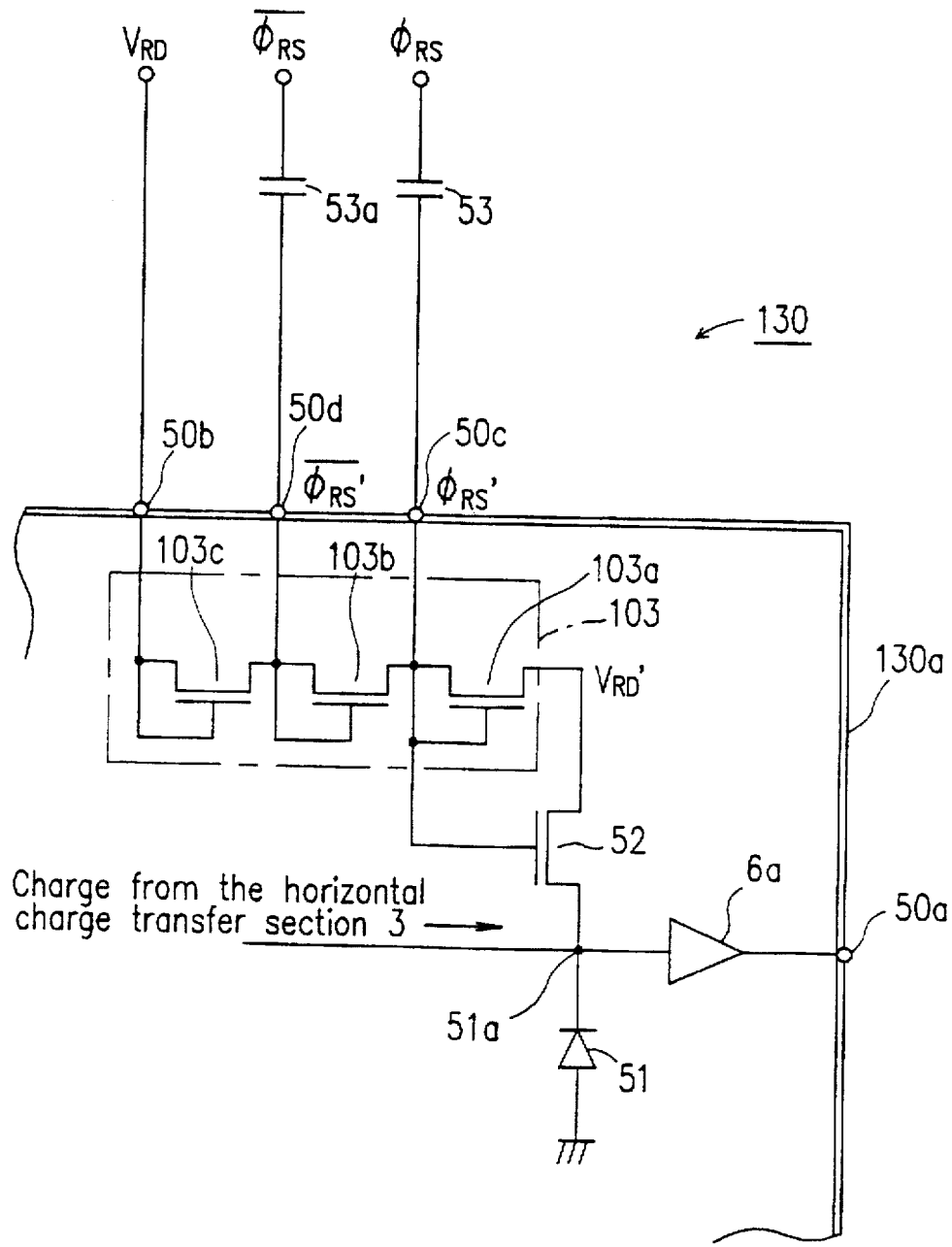
FIG. 7 is a circuit diagram of a solid-state imaging device in a third example according to the present invention.

FIG. 7 is a circuit diagram of a solid-state imaging device 130 in a third example according to the present invention.

The solid-state imaging device 130 is different from the solid-state imaging device 110 in the first example in that a CCD chip 130a of the solid-state imaging device 130 includes a voltage generation circuit 103 in lieu of the voltage generation circuit 101. The voltage generation circuit 103 is provided for receiving a reset gate clock $\phi_{RS}$, an inverted clock /$\phi_{RS}$ thereof, and a reset drain voltage $V_{RD}$ and generating a gate pulse $\phi_{RS}'$ to be applied to the gate of the reset transistor 52 and a drain voltage $V_{RD}'$ to be applied to the drain of the reset transistor 52. The drain of the reset transistor 52 is common with the drain of the first voltage generation transistor 103a. Except for this point, the solid-state imaging device 130 has the same structure as the solid-state imaging device 110.

The voltage generation circuit 103 includes a first voltage generation transistor 103a, a second voltage generation transistor 103b, and a third voltage generation transistor 103c. The first voltage generation transistor 103a has a source and a gate both connected to the signal terminal 50c and a drain connected to the drain of the reset transistor 52. The second voltage generation transistor 103b has a source and a gate both connected to a signal terminal 50d and a drain connected to the signal terminal 50c. The third voltage generation transistor 103c has a source and a gate both connected to a signal terminal 50b and a drain connected to the signal terminal 50d.

The signal terminal 50c is supplied with a reset gate clock $\phi_{RS}$ via the capacitor 53, the signal terminal 50d is supplied with an inverted clock /$\phi_{RS}$ of the reset gate clock $\phi_{RS}$ via a capacitor 53a, and the signal terminal 50b is supplied with a reset drain voltage $V_{RD}$.

Each of the first, second, and third voltage generation transistors 103a, 103b and 103c is an N-channel type transistor acting as a diode, which has a threshold voltage $V_t(V_{RD}) \geq 0$. Each of the first, second, and third voltage generation transistors 103a, 103b and 103c is shortcircuited. Hereinafter, the first, second, and third voltage generation transistors 103a, 103b and 103c will also be referred to as "diodes 103a, 103b and 103c". The first voltage generation transistor 103a, which corresponds to a final transistor in a conventional multiple-stage charge pump circuit, is formed simultaneously by the same process and has the same structure as the reset transistor 52. The second and third voltage generation transistors 103b and 103c need to have a positive threshold voltage in the operational state but need not be a transistor formed by the same process and have the same structure as the reset transistor 52. As in the previous examples, the first voltage generation transistor 103a and the reset transistor 52, which are formed by the same process and have the same structure, always have the same channel potential. Thus, the reset drain voltage applied to the transistors 103a and 52 can be reduced.

Figure 8A:
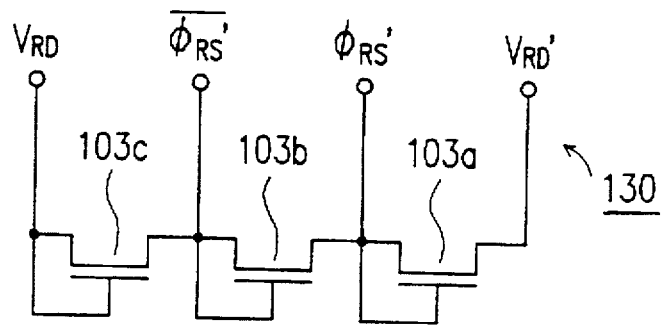
FIGS. 8A and 8B are equivalent circuit diagrams of a pulse generation circuit in the solid-state imaging device shown in FIG. 7.
Figure 8B:
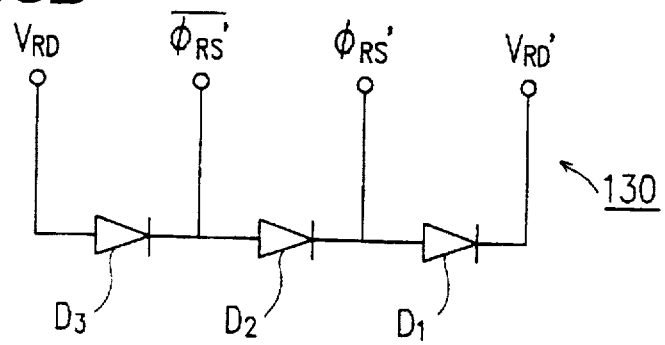
Figure 9:
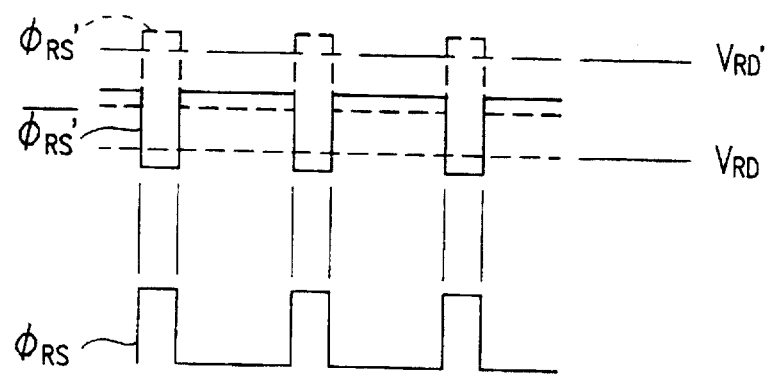
FIG. 9 is a timing diagram illustrating the relationship between a reset gate clock $\phi_{RS}$ and a gate pulse $\phi_{RS}'$ of the solid-state imaging device shown in FIG. 7.

FIG. 8A is an equivalent circuit diagram of the voltage generation circuit 103 with the first, second, and third voltage generation transistors 103a, 103b and 103c. FIG. 8B is also an equivalent circuit diagram of the voltage generation circuit 103 which represents the first, second, and third voltage generation transistors 103a, 103b, and 103c as diodes (D1, D2 and D3). FIG. 9 is a timing diagram illustrating the relationship between the reset gate clock $\phi_{RS}$ and the gate pulse $\phi_{RS}'$. The drop voltages of the diodes 103a, 103b and 103c in the forward direction are equal to the threshold voltages $V_{t1}$, $V_{t2}$ and $V_{t3}$ of the respective voltage generation transistors 103a, 103b and 103c.

The drain voltage $V_{RD}'$ which usually needs to be relatively high, is raised by the multiple-stage charge pump circuit. Accordingly, the required reset drain voltage $V_{RD}$ can be still lower than that of the second example.

In a solid-state imaging device according to the present invention, a pulse to be applied to the gate of the reset transistor is internally generated using a voltage generation transistor having the same structure as the reset transistor and sharing a common drain with the reset transistor. In such a system, the voltage generation transistor and the reset transistor always have the same channel potential even if the reset drain voltage externally provided changes or the threshold voltage of the voltage generation transistor changes as a result of fluctuation in fabrication process parameters. Since there is no need to allow for such change, the amplitude of the reset drain voltage $V_{RD}$ externally supplied can be reduced. Furthermore, an external circuit for generating a DC voltage to be superimposed on the reset gate clock $\phi_{RS}$ can be eliminated. Thus, the solid-state imaging device can be reduced in size, weight and production cost.

In the case where the solid-state imaging device includes an additional voltage generation transistor, the resistor for charging a capacitor to turn on the voltage generation transistor can be eliminated.

In the case where the solid-state imaging device includes a transistor for raising the reset drain voltage $V_{RD}$ externally provided, such a voltage, which usually needs to be relatively high, can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A solid-state imaging device, comprising:
   a plurality of photodiodes for generating signal charge by photoelectric conversion in response to incident light, the photodiodes being formed on a substrate in either a one-dimensional arrangement or a two-dimensional arrangement;
   a charge transfer section formed on the substrate for receiving the signal charge from the photodiodes and for transferring the signal charge toward an output portion;
   a charge-accumulating region formed on the substrate for receiving the signal charge from the output portion of the charge transfer section and for accumulating the signal charge;
   a reset circuit for resetting a state of the charge-accumulating region in response to a reset signal, the reset circuit comprising a first MOS transistor formed on the substrate, the first MOS transistor having a source connected to the charge-accumulating region, a drain supplied with a drain voltage for removing the signal charge, and a gate for connecting the source to the drain in response to the reset signal; and
   a voltage generation circuit including at least a second MOS transistor formed on the same substrate, the second MOS transistor serving as a first diode between the gate and the drain of the first MOS transistor,
   wherein the voltage generation circuit generates a first forward voltage of the first diode in response to the reset signal, and applies the first forward voltage between the gate and the drain of the first MOS transistor.

2. A solid-state imaging device according to claim 1, wherein the voltage generation circuit further includes a third MOS transistor serving as a second diode for forming a second forward voltage, and generates a voltage to be applied to the drain of the first MOS transistor utilizing the first and second forward voltages of the first and second diodes.

3. A solid-state imaging device according to claim 1,
   wherein the second MOS transistor has a source connected to the gate of the first MOS transistor, a drain connected to the drain of the first MOS transistor, and a gate connected to the source of the second MOS transistor,
   the gate and the source of the second MOS transistor are externally supplied with a reset clock via a capacitor, and
   the drain of the second MOS transistor is externally supplied with a reset drain voltage.

4. A solid-state imaging device according to claim 3, wherein the voltage generation circuit further includes a resistor connecting the source of the second MOS transistor and the drain of the second MOS transistor.

5. A solid-state imaging device according to claim 2,
   wherein a gate and a source of the third MOS transistor are externally supplied with a voltage for releasing the charge, and
   a drain of the third MOS transistor is connected to the gate and source of the second MOS transistor and to the gate of the first MOS transistor, and the drain of the third MOS transistor is externally supplied with a reset clock via a capacitor.

6. A solid-state imaging device according to claim 2, wherein the voltage generation circuit further includes a fourth MOS transistor serving as a third diode for forming a third forward voltage, and generates a voltage to be applied to the drain of the first MOS transistor utilizing the forward voltages of the first, second and third diodes.

7. A solid-state imaging device according to claim 1, wherein the second MOS transistor has the same threshold level as the first MOS transistor.

8. A solid-state imaging device according to claim 1, wherein the second MOS transistor has the same structure as the first MOS transistor.

9. A solid-state imaging device according to claim 1, wherein the first and second MOS transistors are simultaneously formed by the common fabrication process steps.

* * * * *